United States Patent
Colton et al.

(10) Patent No.: US 10,417,504 B2
(45) Date of Patent: Sep. 17, 2019

(54) SMART MIRROR MECHANISM

(71) Applicant: Intel Corporation, Santa Clara, CA (US)

(72) Inventors: Vladimir Colton, Haifa (IL); Artyom Khvediouk, Nesher (IL); Ayoob Nabwani, Haifa (IL); Saar Amzaleg, Haifa (IL)

(73) Assignee: INTEL CORPORATION, Santa Clara, CA (US)

( * ) Notice: Subject to any disclaimer, the term of this patent is extended or adjusted under 35 U.S.C. 154(b) by 814 days.

(21) Appl. No.: 14/862,760

(22) Filed: Sep. 23, 2015

(65) Prior Publication Data

US 2017/0083776 A1 Mar. 23, 2017

(51) Int. Cl.
*G08G 1/00* (2006.01)
*B60W 30/08* (2012.01)
*G06K 9/00* (2006.01)
*H04N 5/232* (2006.01)
*B60Q 9/00* (2006.01)

(52) U.S. Cl.
CPC ......... *G06K 9/00805* (2013.01); *B60Q 9/008* (2013.01); *H04N 5/232* (2013.01)

(58) Field of Classification Search
CPC .......... H04N 13/02; H04N 5/14; H04N 5/225; H04M 1/725

USPC ........................................................ 348/148
See application file for complete search history.

(56) References Cited

U.S. PATENT DOCUMENTS

| | | | | |
|---|---|---|---|---|
| 2004/0090533 | A1* | 5/2004 | Dow | H04N 5/232 348/220.1 |
| 2015/0334269 | A1* | 11/2015 | Yokota | G06K 9/00805 382/103 |
| 2016/0065943 | A1* | 3/2016 | Yim | H04N 13/271 348/46 |
| 2017/0279957 | A1* | 9/2017 | Abramson et al. | H04M 1/72577 |

* cited by examiner

*Primary Examiner* — Patricia I Young
(74) *Attorney, Agent, or Firm* — Womble Bond Dickinson (US) LLP

(57) ABSTRACT

A system is described. The system includes one or more sensing devices to acquire depth image data, scan logic to scan the depth image data for moving objects, vehicle recognition logic to recognize an automobile in the scanned image data, capture a registered plate number of the automobile and connect with the automobile based on the captured registered plate number and object recognition logic to recognize a presence of one or more moving objects in the depth image data that are about to come across a path of the automobile.

24 Claims, 7 Drawing Sheets

SMART MIRROR MECHANISM

FIELD

Embodiments described herein generally relate to transportation. More particularly, embodiments relate to computing devices in transportation systems.

BACKGROUND

Considerable resources have been expended in devising solutions to prevent vehicle crashes attributable to driver blind spots. For instance, convex mirrors have been implemented in parking lots and street intersections to alert drivers to objects (e.g., other vehicles, cyclist, pedestrians, etc.) that may be about to cross the driver's path positioned and positioned in the driver's blind spot. However, these mirrors are not always effective since drivers often neglect them.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

Embodiments may be embodied in systems, apparatuses, and methods for a smart mirror mechanism, as described below. In the description, numerous specific details, such as component and system configurations, may be set forth in order to provide a more thorough understanding of the present invention. In other instances, well-known structures, circuits, and the like have not been shown in detail, to avoid unnecessarily obscuring the present invention.

Figure 3:
FIG. 3 illustrates a conventional implementation of convex mirrors.

Embodiments provide for a smart mirror application are provided. As discussed above, conventional convex mirrors implemented to alert drivers to objects in a driver's blind spot are ineffective. For instance, FIG. 3 illustrates a conventional implementation in which convex mirrors are placed at various blind spots/dead zones (e.g., 1, 2 and 3) to alert drivers of the presence of pedestrians that may be about to enter the street. However, a driver may easily neglect these mirrors while passing and thus remain unaware of the crossing pedestrians.

According to one embodiment, a smart mirror mechanism provides an integration between automobiles and smart mirrors via a network. In such an embodiment, the smart mirror mechanism detects oncoming moving objects, connect to a vehicle infotainment (IVI) system of an approaching automobile, and presents video via the IVI system, along with highlighted objects. In a further embodiment, the smart mirror mechanism activates perimeter lights, and lights and tracks the moving object, thus alerting a driver of the automobile of potential danger.

Although disclosed as being implemented in an automobile, other embodiments may feature the smart mirror mechanism being implemented in any type of personal conveyance system having a built-in computer. For example, a boat or motorcycle application may be implemented. For simplicity, however, remainder of this document will refer to the term "automobile" as intending to include all varieties of personal conveyances.

Figure 1:
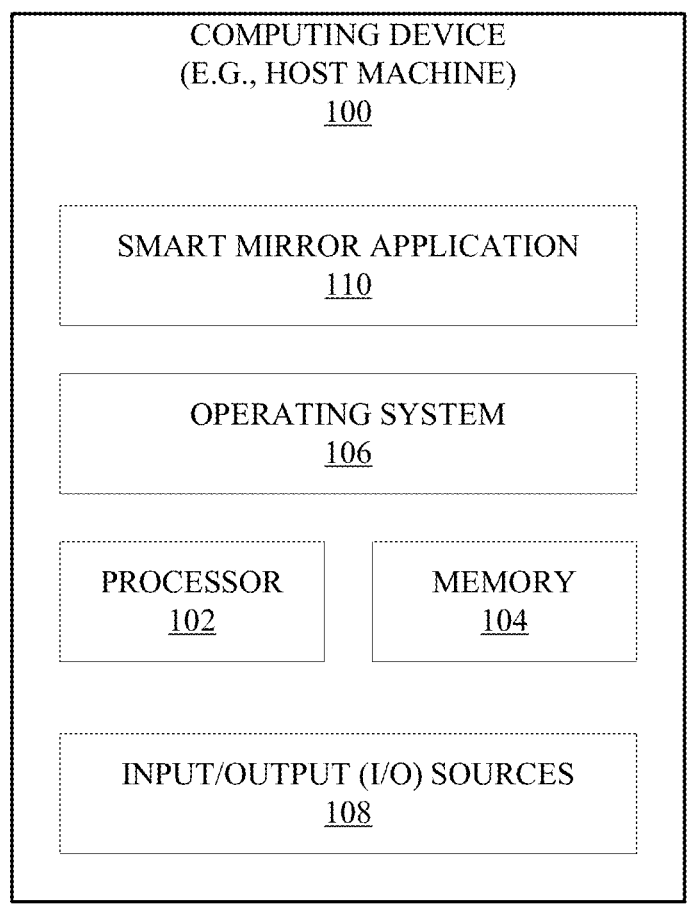
FIG. 1 illustrates one embodiment of a computing device.
Figure 2:
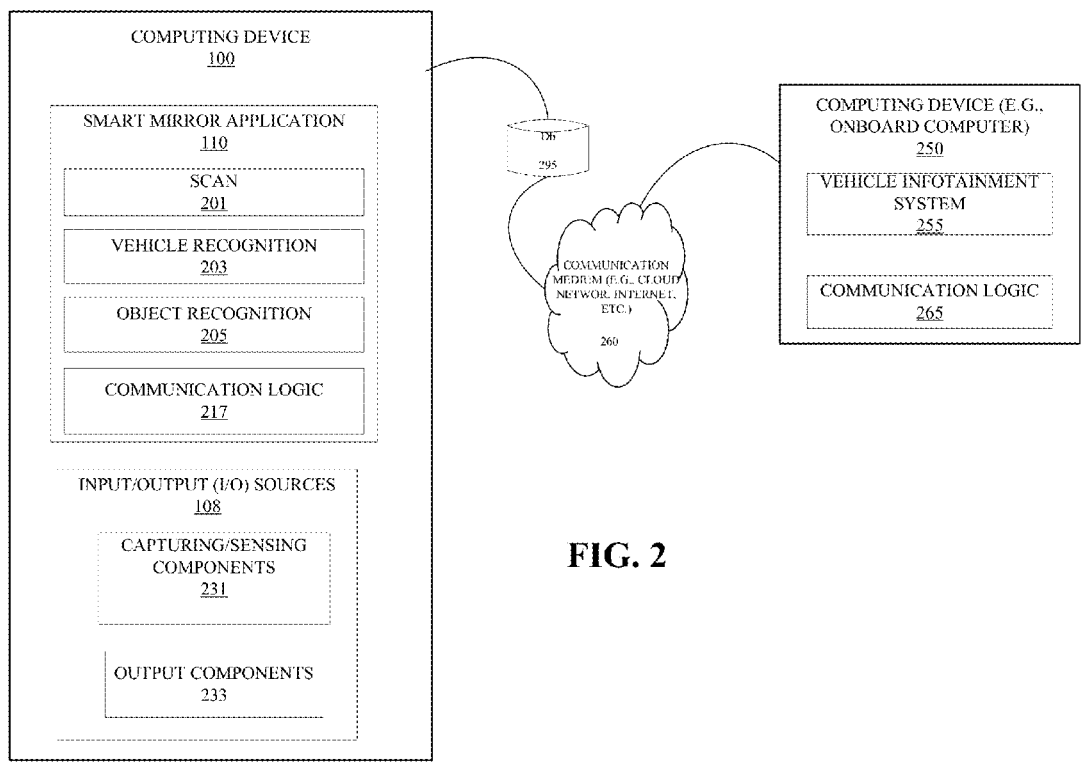
FIG. 2 illustrates one embodiment of a smart mirror mechanism.

FIG. 1 illustrates one embodiment of a computing device 100 implementing a smart mirror application 110. In one embodiment, computing device (or smart mirror) 100 serves as a host machine for hosting smart mirror application 110 that includes a combination of any number and type of components, as illustrated in FIG. 2, for implementing a smart mirror mechanism at computing devices, as will be further described throughout this document.

Computing device 100 may include any number and type of data processing devices, such as a smart display device, such as large computing systems, such as mobile computing devices, such as cellular phones including smartphones, personal digital assistants (PDAs), tablet computers, laptop computers (e.g., notebook, netbook, Ultrabook™, etc.), e-readers, etc. In yet other embodiments, computing device 100 may include server computers, desktop computers, etc., and may further include set-top boxes (e.g., Internet-based cable television set-top boxes, etc.), global positioning system (GPS)-based devices, etc.

In other embodiments, computing device 100 may include any number and type of data processing devices, such as large computing systems, such as server computers, desktop computers, etc., and may further include set-top boxes (e.g., Internet-based cable television set-top boxes, etc.), global positioning system (GPS)-based devices, etc. Computing device 100 may include mobile computing devices serving as communication devices, such as cellular phones including smartphones, personal digital assistants (PDAs), tablet computers, laptop computers (e.g., Ultrabook™ system, etc.), e-readers, media internet devices (MIDs), media players, smart televisions, television platforms, intelligent devices, computing dust, media players, head-mounted displays (HMDs) (e.g., wearable glasses, head-mounted binoculars, gaming displays, military headwear, etc.), and other wearable devices (e.g., smartwatches, bracelets, smartcards, jewelry, clothing items, etc.), and/or the like.

Computing device 100 may include an operating system (OS) 106 serving as an interface between hardware and/or physical resources of the computer device 100 and a user. Computing device 100 further includes one or more processor(s) 102, memory devices 104, network devices, drivers, or the like, as well as input/output (I/O) sources 108, such as touchscreens, touch panels, touch pads, virtual or regular keyboards, virtual or regular mice, etc.

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", "code", "software code", and the like, may be used interchangeably throughout this document. Also, terms like "job", "input", "request", "message", and the like, may be used interchangeably throughout this document. It is contemplated that the term "user" may refer to an individual or a person or a group of individuals or persons using or having access to computing device 100.

FIG. 2 illustrates one embodiment of a smart mirror application 110. Smart mirror application 110 may include any number and type of components, such as (without limitation): scan logic 201; vehicle recognition logic 203; object recognition logic 205; and communication/compatibility logic 217. Computing device 100 is further shown as hosting input/output sources 108 having capturing/sensing components 231 and output sources 233, where capturing/sensing components 231 include depth-sensing camera(s) 232.

According to one embodiment, scan logic 201 continuously scans image data for moving objects that are approaching computing device 100. In such an embodiment, scan logic 201 acquires the image data from capturing/sensing components 231. Capturing/sensing components 231 may include (without limitation) two-dimensional (2D) cameras, three-dimensional (3D) cameras, depth-sensing cameras, sensor arrays (e.g., sensor array (environmental sensors, such as camera sensors, ambient light sensors, Red Green Blue (RGB) sensors, movement sensors, etc.), image sources, audio/video/signal detectors, microphones, etc. In one embodiment, computing device 100 may be placed at a blind spot/dead zone location at which an automobile approaches.

Vehicle recognition logic 203 receives data from scan logic and determines whether a moving object in the data is recognized as an automobile. Upon a determination that an oncoming object is an automobile, vehicle recognition logic 203 captures the registered plate number of the automobile, checks one or more databases 295 for the vehicle information. In one embodiment, automobiles are registered with smart mirror application 110 with vehicle information corresponding to the plate number, both of which are stored in database 295. Thus, information needed to connect with an automobile is indexed in database 295 by the registered plate number of the automobile.

Once vehicle information is acquired, recognition logic 203 connects with, and provides live video data to, a computing device 250. In one embodiment, computing device 100 may be in communication with one or more computing devices (also referred to as "onboard computer devices") over communication medium 260, such as one or more networks (e.g., Cloud network, the Internet, proximity network, such as Bluetooth, etc.), via communication logic 217.

Communication logic 217 may be used to facilitate dynamic communication and compatibility between computing devices 100, 250, database(s) 295, communication medium 260, etc., and any number and type of other computing devices (such as wearable computing devices, mobile computing devices, desktop computers, server computing devices, etc.), processing devices (e.g., central processing unit (CPU), graphics processing unit (GPU), etc.), capturing/sensing components (e.g., non-visual data sensors/detectors, such as audio sensors, olfactory sensors, haptic sensors, signal sensors, vibration sensors, chemicals detectors, radio wave detectors, force sensors, weather/temperature sensors, body/biometric sensors, scanners, etc., and visual data sensors/detectors, such as cameras, etc.), user/context-awareness components and/or identification/verification sensors/devices (such as biometric sensors/detectors, scanners, etc.), memory or storage devices, data sources, and/or database(s) (such as data storage devices, hard drives, solid-state drives, hard disks, memory cards or devices, memory circuits, etc.), network(s) (e.g., Cloud network, the Internet, Internet of Things, intranet, cellular network, proximity networks, such as Bluetooth, Bluetooth low energy (BLE), Bluetooth Smart, Wi-Fi proximity, Radio Frequency Identification (RFID), Near Field Communication (NFC), Body Area Network (BAN), etc.), wireless or wired communications and relevant protocols (e.g., Wi-Fi®, WiMAX, Ethernet, etc.), connectivity and location management techniques, software applications/websites, (e.g., social and/or business networking websites, business applications, games and other entertainment applications, etc.), programming languages, etc., while ensuring compatibility with changing technologies, parameters, protocols, standards, etc.

Computing device 250 may also include communication logic 265 to facilitate operation of the smart mirror mechanism. Communication logic 265 of computing device 250 may be similar to or the same as communication logic 225 of computing device 100. Computing device 250 includes vehicle infotainment system 255, which delivers entertainment and information content to the driver of an automobile at which computing device 250. In one embodiment, vehicle infotainment system 255 receives and displays the live video data from computing device 100.

Object recognition logic 205 recognizes the presence of moving objects (e.g., vehicles, bicycles, animals etc.) that are about to come across the path of the automobile having computing device 250. Upon detecting such an object, recognition logic 205 causes device 100 to flash, as well as light the object. In such an embodiment, the output components 233 include indicator lights at the perimeter of device 100 that flash in red upon detecting moving objects that are about to come across the path of the automobile.

In one embodiment, object recognition logic transmits an alert message to computing device 100 that is included in the live video data while the object remains present. In a further embodiment, recognition logic 205 causes device 100 to flash a green light if no moving objects are present. Output components 233 may further include (without limitation) audio/video/signal sources, display planes, display panels, display screens/devices, projectors, display/projection areas, speakers, etc.

According to one embodiment, object recognition logic 205 continues to track the moving object during their crossing and continues to light the object in red. Once the way is clear of the moving object, recognition logic 205 causes device 100 to flash a green light, as well as transmit a message to vehicle infotainment system 255 informing that the way is clear to move.

Figure 4:
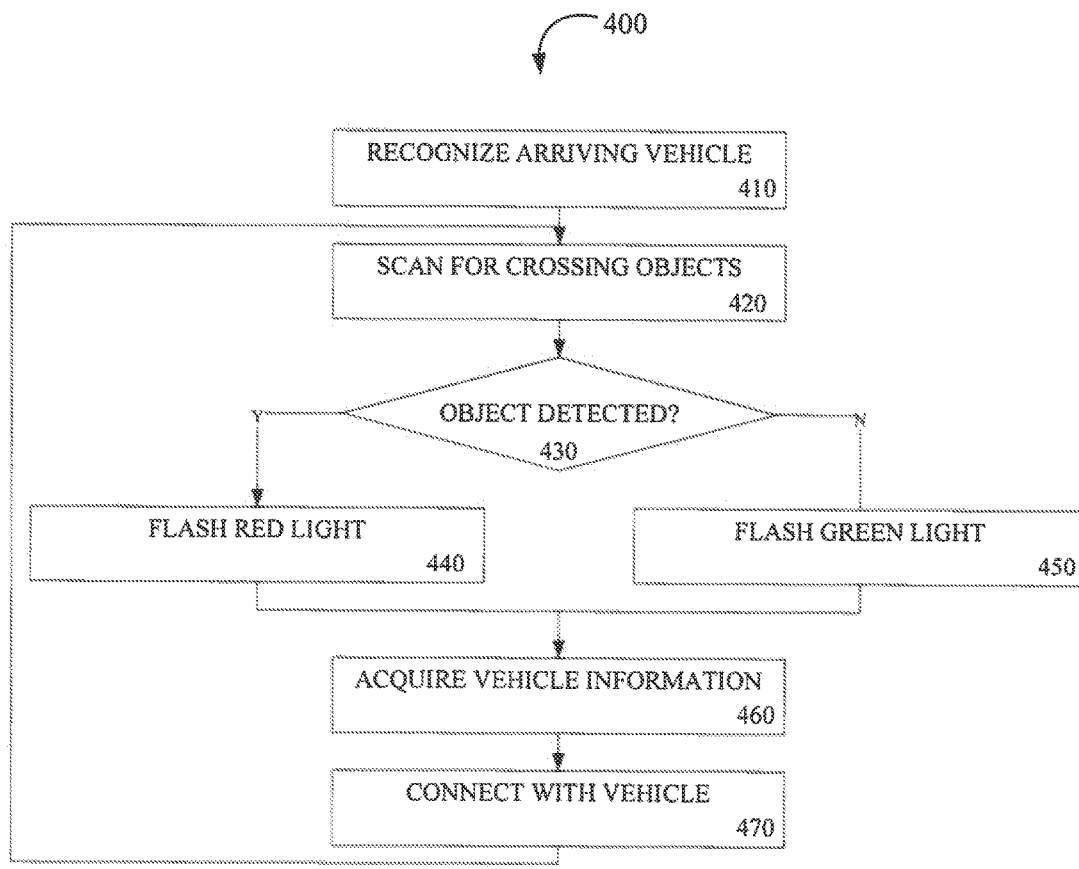
FIG. 4 is a flow diagram illustrating one embodiment of a smart mirror process.

FIG. 4 is a flow diagram illustrating one embodiment of a process 400 performed by a smart mirror application. Process 400 may be performed by processing logic that may comprise hardware (e.g., circuitry, dedicated logic, programmable logic, etc.), software (such as instructions run on a processing device), or a combination thereof. The methods of process 400 are illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-3 may not be discussed or repeated here.

At processing block 410, the smart mirror recognizes a vehicle arriving from a direction which the smart mirror is dedicated. At processing 420, the smart mirror scans for crossing objects. At decision block 430, a determination is made at to whether a crossing object has been detected. Smart mirror flashes red if an object is detected, processing block 440. Alternatively, smart mirror is lit in green if no object is detected, processing block 450.

At processing block 460, the vehicle information is acquired from database 295 using scanned license plate data. At processing block 470, smart mirror application 110 establishes a connection with the automobile indicated in the vehicle information and streams live video data to vehicle infotainment system 255. If a crossing object has been detected, smart mirror application 110 presents the object in the video data highlighted in red, along with an alert message. If no crossing object has been detected, smart mirror application 110 provides an indication that the path is clear.

Figure 5A:
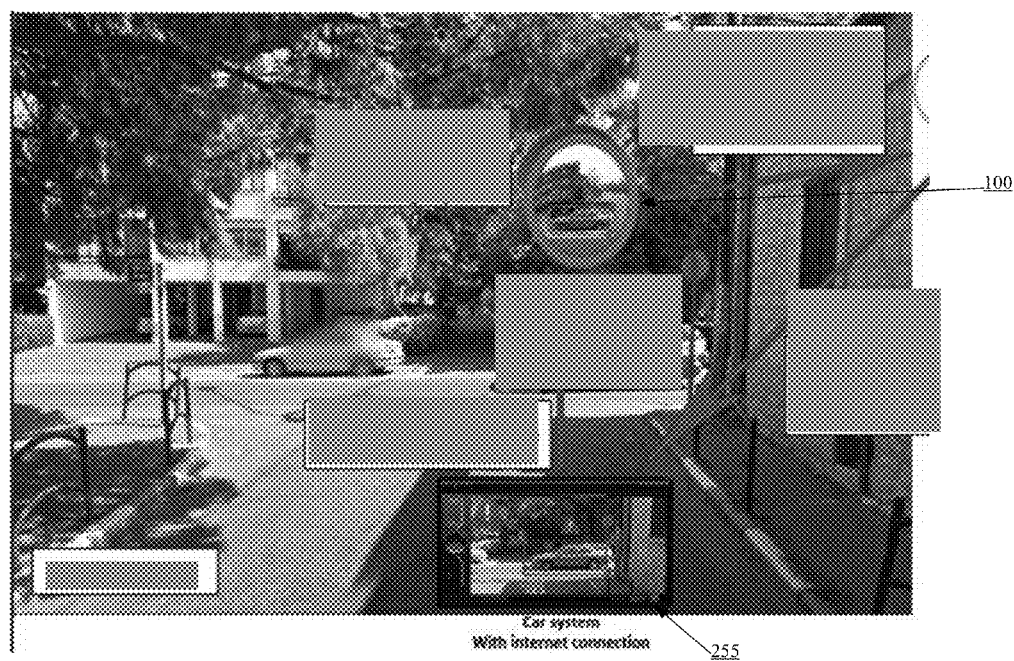
FIGS. 5A and 5B illustrate embodiments of implementation of a smart mirror mechanism.
Figure 5B:
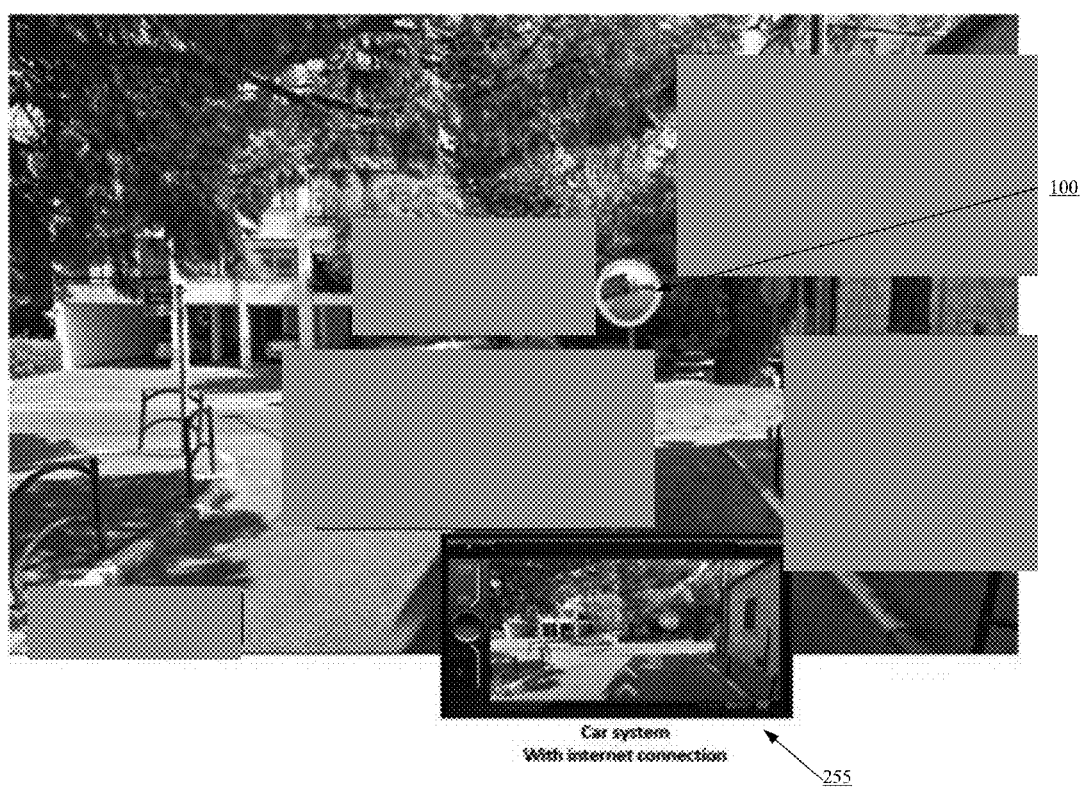

FIGS. 5A and 5B illustrate embodiments of an implementation of a smart mirror mechanism. FIG. 5A shows a scenario in which a crossing object is detected and displayed in the smart mirror. Additionally, live video of the scene is displayed at vehicle infotainment system 255, along with the highlighted object and an alert. Similarly, FIG. 5B shows the scenario in which no crossing object is detected.

Figure 6:
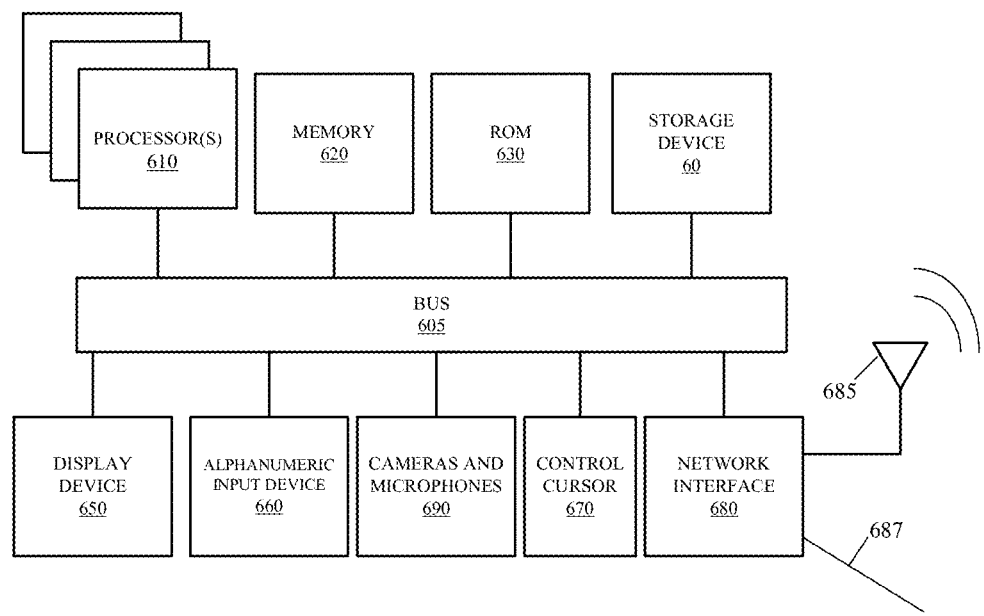
FIG. 6 illustrates a computer system suitable for implementing embodiments of the present disclosure.

FIG. 6 illustrates a computer system suitable for implementing embodiments of the present disclosure. Computing system 600 includes bus 605 (or, for example, a link, an interconnect, or another type of communication device or interface to communicate information) and processor 610 coupled to bus 605 that may process information. While computing system 700 is illustrated with a single processor, electronic system 600 and may include multiple processors and/or co-processors, such as one or more of central processors, graphics processors, and physics processors, etc. Computing system 600 may further include random access memory (RAM) or other dynamic storage device 620 (referred to as main memory), coupled to bus 605 and may store information and instructions that may be executed by processor 610. Main memory 720 may also be used to store temporary variables or other intermediate information during execution of instructions by processor 610.

Computing system 600 may also include read only memory (ROM) and/or other storage device 630 coupled to bus 605 that may store static information and instructions for processor 610. Date storage device 640 may be coupled to bus 605 to store information and instructions. Date storage device 640, such as magnetic disk or optical disc and corresponding drive may be coupled to computing system 600.

Computing system 600 may also be coupled via bus 605 to display device 650, such as a cathode ray tube (CRT), liquid crystal display (LCD) or Organic Light Emitting Diode (OLED) array, to display information to a user. User input device 660, including alphanumeric and other keys, may be coupled to bus 605 to communicate information and command selections to processor 610. Another type of user input device 660 is cursor control 670, such as a mouse, a trackball, a touchscreen, a touchpad, or cursor direction keys to communicate direction information and command selections to processor 610 and to control cursor movement on display 650. Camera and microphone arrays 690 of computer system 600 may be coupled to bus 605 to observe gestures, record audio and video and to receive and transmit visual and audio commands.

Computing system 700 may further include network interface(s) 680 to provide access to a network, such as a local area network (LAN), a wide area network (WAN), a metropolitan area network (MAN), a personal area network (PAN), Bluetooth, a cloud network, a mobile network (e.g., 3$^{rd}$ Generation (3G), etc.), an intranet, the Internet, etc. Network interface(s) 680 may include, for example, a wireless network interface having antenna 685, which may represent one or more antenna(e). Network interface(s) 680 may also include, for example, a wired network interface to communicate with remote devices via network cable 687, which may be, for example, an Ethernet cable, a coaxial cable, a fiber optic cable, a serial cable, or a parallel cable.

Network interface(s) 680 may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported.

In addition to, or instead of, communication via the wireless LAN standards, network interface(s) 680 may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) 680 may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing system 600 may vary from implementation to implementation depending upon numerous factors, such as price constraints, performance requirements, technological improvements, or other circumstances. Examples of the electronic device or computer system 600 may include without limitation a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for facilitating hybrid communication according to embodiments and examples described herein.

Some embodiments pertain to Example 1 that includes a smart mirror system comprising one or more sensing devices to acquire depth image data, scan logic to scan the depth image data for moving objects, vehicle recognition logic to recognize an automobile in the scanned image data, capture a registered plate number of the automobile and connect with the automobile based on the captured registered plate number and object recognition logic to recognize a presence of one or more moving objects in the depth image data hat are about to come across a path of the automobile.

Example 2 includes the subject matter of Example 1, further comprising an output component including indicator lights.

Example 3 includes the subject matter of Examples 1 and 2, wherein the indicator lights comprise red lights that flash when the object recognition logic recognizes the one or more moving objects that are about to come across the path of the automobile.

Example 4 includes the subject matter of Examples 1-3, wherein the indicator lights comprise green lights that flash when the object recognition logic recognizes that no moving objects are present.

Example 5 includes the subject matter of Examples 1-4, wherein the vehicle recognition logic transmits the depth image data to the automobile.

Example 6 includes the subject matter of Example 1-5, wherein the transmitted depth image data includes the one or more moving objects.

Example 7 includes the subject matter of Examples 1-6, wherein the object recognition logic transmits an alert message to the automobile while the one or more moving objects remain present.

Example 8 includes the subject matter of Examples 1-7, further comprising a database having information to connect with the automobile using the registered plate number of the automobile.

Some embodiments pertain to Example 9 that includes a smart mirror method comprising acquiring depth image data from one or more sensing devices, scanning the depth image data for moving objects, recognizing the scanned image data as an automobile, capturing a registered plate number of the automobile, connecting with the automobile based on the captured registered plate number and recognizing a presence of one or more moving objects in the depth image data that are about to come across a path of the automobile.

Example 10 includes the subject matter of Example 9, further comprising flashing red indicator lights upon recognizing the one or more moving objects that are about to come across the path of the automobile.

Example 11 includes the subject matter of Examples 9 and 10, further comprising flashing green indicator lights when no moving objects are recognized.

Example 12 includes the subject matter of Examples 9-11, further comprising transmitting the depth image data to the automobile.

Example 13 includes the subject matter of Examples 9-12, wherein the transmitted depth image data includes the one or more moving objects.

Example 14 includes the subject matter of Examples 9-13, further comprising transmitting an alert message to the automobile while the one or more moving objects remain present.

Example 15 includes the subject matter of Examples 9-14, further comprising accessing connection information in a database using the captured registered plate number and using the connection information to connect with the automobile.

Some embodiments pertain to Example 16 that includes a network comprising an automobile having a vehicle infotainment (IVI) system, a smart mirror, including one or more sensing devices to acquire depth image data, scan logic to scan the depth image data for moving objects, vehicle recognition logic to recognize an automobile in the scanned image data, capture a registered plate number of the automobile and connect with the IVI system based on the captured registered plate number and object recognition logic to recognize a presence of one or more moving objects in the depth image data hat are about to come across a path of the automobile.

Example 17 includes the subject matter of Example 16, wherein the smart mirror further comprises an output component, including red lights indicator to flash when object recognition logic recognizes the one or more moving objects that are about to come across the path of the automobile; and green indicator lights to flash when the object recognition logic recognizes that no moving objects are present.

Example 18 includes the subject matter of Examples 16 and 17, wherein the vehicle recognition logic transmits the depth image data to the IVI system.

Example 19 includes the subject matter of Examples 16-18, wherein the object recognition logic transmits an alert message to the IVI system while the one or more moving objects remain present.

Example 20 includes the subject matter of Examples 16-19, further comprising a database having information to connect with the IVI system using the registered plate number of the automobile.

Some embodiments pertain to Example 21 that includes at least one machine-readable medium having instructions stored thereon, which when executed by a processor, causes the processor to perform operations in method claims 9-15

Some embodiments pertain to Example 22 that includes at least one machine-readable medium having instructions stored thereon, which when executed by a processor, causes the processor to acquire depth image data from one or more sensing devices, scan the depth image data for moving objects, recognize the scanned image data as an automobile, capture a registered plate number of the automobile, connect with the automobile based on the captured registered plate number and recognize a presence of one or more moving objects in the depth image data that are about to come across a path of the automobile.

Example 23 includes the subject matter of Example 22, having instructions stored thereon, which when executed by a processor, further causes the processor to flash red indicator lights upon recognizing the one or more moving objects that are about to come across the path of the automobile and flash green indicator lights when no moving objects are recognized.

Example 24 includes the subject matter of Examples 22 and 23, having instructions stored thereon, which when executed by a processor, further causes the processor to transmit the depth image data to the automobile.

Example 25 includes the subject matter of Examples 22-24, wherein the transmitted depth image data includes the one or more moving objects.

Example 26 includes the subject matter of Examples 22-25, having instructions stored thereon, which when executed by a processor, further causes the processor to transmit an alert message to the automobile while the one or more moving objects remain present.

Some embodiments pertain to Example 27 that includes a smart mirror system comprising means for acquiring depth image data from one or more sensing devices, means for scanning the depth image data for moving objects, means for recognizing the scanned image data as an automobile, means for capturing a registered plate number of the automobile, means for connecting with the automobile based on the captured registered plate number and means for recognizing a presence of one or more moving objects in the depth image data that are about to come across a path of the automobile.

Example 28 includes the subject matter of Example 27, means for flashing red indicator lights upon recognizing the one or more moving objects that are about to come across the path of the automobile and means for flashing green indicator lights when no moving objects are recognized.

Example 29 includes the subject matter of Examples 27 and 28, further comprising means for transmitting the depth image data to the automobile.

Example 30 includes the subject matter of Examples 27-29, wherein the transmitted depth image data includes the one or more moving objects.

Example 31 includes the subject matter of Examples 27-30, further comprising means for transmitting an alert message to the automobile while the one or more moving objects remain present.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A smart mirror system comprising:
   one or more sensing devices to acquire depth image data;
   scan logic to scan the depth image data for moving objects;
   vehicle recognition logic to recognize an automobile in the scanned image data, capture a registered plate number of the automobile and connect with the automobile based on the captured registered plate number;
   object recognition logic to recognize a presence of one or more moving objects in the depth image data that are about to come across a path of the automobile and inform the automobile of the presence of the one or more moving objects; and
   output component including indicator lights comprising first lights that flash when the object recognition logic recognizes the one or more moving objects that are about to come across the path of the automobile and second lights that flash when the object recognition logic recognizes that no moving objects are present, wherein the first lights have a different color than the second lights.

2. The system of claim 1, wherein the first lights include red lights.

3. The system of claim 2, wherein the second lights include green lights.

4. The system of claim 3, wherein the vehicle recognition logic transmits the depth image data to the automobile.

5. The system of claim 4, wherein the transmitted depth image data includes the one or more moving objects.

6. The system of claim 5, wherein the object recognition logic transmits an alert message to the automobile while the one or more moving objects remain present.

7. The system of claim 1, further comprising a database having information to connect with the automobile using the registered plate number of the automobile.

8. A smart mirror method comprising:
   acquiring depth image data from one or more sensing devices;

scanning the depth image data for moving objects;
recognizing the scanned image data as an automobile;
capturing a registered plate number of the automobile;
connecting with the automobile based on the captured registered plate number;
recognizing a presence of one or more moving objects in the depth image data that are about to come across a path of the automobile and informing the automobile of the presence of the one or more moving objects; and
flashing first lights upon recognizing the one or more moving objects that are about to come across the path of the automobile and flashing second lights when no moving objects are recognized, wherein the first lights have a different color than the second lights.

9. The method of claim 8, wherein the first lights include red indicator lights.

10. The method of claim 9, wherein the second lights include green indicator lights.

11. The method of claim 8, further comprising transmitting the depth image data to the automobile.

12. The method of claim 11, wherein the transmitted depth image data includes the one or more moving objects.

13. The method of claim 12, further comprising transmitting an alert message to the automobile while the one or more moving objects remain present.

14. The method of claim 8, further comprising:
accessing connection information in a database using the captured registered plate number; and
using the connection information to connect with the automobile.

15. A network machine comprising:
an automobile having a vehicle infotainment (IVI) system;
a smart mirror, including:
one or more sensing devices to acquire depth image data;
scan logic to scan the depth image data for moving objects;
vehicle recognition logic to recognize an automobile in the scanned image data, capture a registered plate number of the automobile and connect with the IVI system based on the captured registered plate number;
object recognition logic to recognize a presence of one or more moving objects in the depth image data that are about to come across a path of the automobile and inform the IVI system of the presence of the one or more moving object; and
an output component including first lights to flash when object recognition logic recognizes the one or more moving objects that are about to come across the path of the automobile and second lights to flash when the object recognition logic recognizes that no moving objects are present, wherein the first lights have a different color than the second lights.

16. The network machine of claim 15, wherein the first lights include red lights and second lights include green lights.

17. The network machine of claim 15, wherein the vehicle recognition logic transmits the depth image data to the IVI system.

18. The network machine of claim 17, wherein the object recognition logic transmits an alert message to the IVI system while the one or more moving objects remain present.

19. The network machine of claim 15, further comprising a database having information to connect with the IVI system using the registered plate number of the automobile.

20. At least one non-transitory machine-readable medium having instructions stored thereon, which when executed by a processor, causes the processor to:
acquire depth image data from one or more sensing devices;
scan the depth image data for moving objects;
recognize the scanned image data as an automobile;
capture a registered plate number of the automobile;
connect with the automobile based on the captured registered plate number;
recognize a presence of one or more moving objects in the depth image data that are about to come across a path of the automobile and inform the automobile of the present of the one or more moving objects; and
flash first lights upon recognizing the one or more moving objects that are about to come across the path of the automobile and flash second lights when no moving objects are recognized, wherein the first lights have a different color than the second lights.

21. The at least one non-transitory machine-readable medium of claim 20, having instructions stored thereon, which when executed by a processor, further causes the processor to:
flash red indicator lights as the first lights upon recognizing the one or more moving objects that are about to come across the path of the automobile; and
flash green indicator lights as the second lights when no moving objects are recognized.

22. The at least one non-transitory machine-readable medium of claim 20, having instructions stored thereon, which when executed by a processor, further causes the processor to transmit the depth image data to the automobile.

23. The at least one non-transitory machine-readable medium of claim 22, wherein the transmitted depth image data includes the one or more moving objects.

24. The at least one non-transitory machine-readable medium of claim 23, having instructions stored thereon, which when executed by a processor, further causes the processor to transmit an alert message to the automobile while the one or more moving objects remain present.

* * * * *